United States Patent
Shokarev et al.

(10) Patent No.: US 10,855,546 B2
(45) Date of Patent: Dec. 1, 2020

(54) SYSTEMS AND METHODS FOR NON-INTRUSIVE NETWORK PERFORMANCE MONITORING

(71) Applicant: Juniper Networks, Inc., Sunnyvale, CA (US)

(72) Inventors: Dmitry A. Shokarev, Mountain View, CA (US); Nayan S Patel, Bedford, MA (US); Alex Baban, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 98 days.

(21) Appl. No.: 16/131,806

(22) Filed: Sep. 14, 2018

(65) Prior Publication Data

US 2020/0092174 A1    Mar. 19, 2020

(51) Int. Cl.
*G06F 15/173* (2006.01)
*H04L 12/24* (2006.01)
*H04L 12/723* (2013.01)
*H04L 29/06* (2006.01)

(52) U.S. Cl.
CPC .......... *H04L 41/14* (2013.01); *H04L 45/50* (2013.01); *H04L 69/22* (2013.01)

(58) Field of Classification Search
CPC ... H04L 43/12; H04L 43/1425; H04L 43/062; H04L 43/04; H04L 43/0888; H04L 63/1425
See application file for complete search history.

(56) References Cited

U.S. PATENT DOCUMENTS

| | | | |
|---|---|---|---|
| 9,038,151 B1* | 5/2015 | Chua | H04L 45/02 709/223 |
| 2009/0154361 A1 | 6/2009 | Dunning | |
| 2013/0227117 A1* | 8/2013 | Meloche | H04L 43/10 709/224 |
| 2015/0319049 A1* | 11/2015 | Nachum | H04L 41/14 370/422 |

(Continued)

OTHER PUBLICATIONS

F. Brockners et al., "Data Fields for In-situ OAM", https://tools.ietf.org/pdf/draft-brockners-inband-oam-data-07.pdf, Jul. 2, 2017, 29 pages.

(Continued)

*Primary Examiner* — Brian Whipple
*Assistant Examiner* — Gregory P Tolchinsky
(74) *Attorney, Agent, or Firm* — Harrity & Harrity, LLP

(57) ABSTRACT

A first network device may receive packets as part of a traffic flow of an internet protocol session, select a packet based on a rule, and add, to a packet replica of the selected packet, routing information capable of being used to generate performance indicators associated with the IP session. The first network device may modify a portion of the packet replica to include values that will cause the packet replica to fail to reach a destination device associated with the IP session, and provide the packet replica to other network devices to cause a second network device to perform a validation procedure to determine that the packet replica is unable to be validated based on the values, to generate the performance indicators using the packet replica or a group of packet replicas that have been modified, and to provide the performance indicators to a particular device.

20 Claims, 8 Drawing Sheets

(56) References Cited

U.S. PATENT DOCUMENTS

| | | | |
|---|---|---|---|
| 2015/0381444 A1* | 12/2015 | Nainar | H04L 43/0811 |
| | | | 370/241.1 |
| 2017/0093911 A1* | 3/2017 | Robertson | H04L 63/1491 |
| 2017/0094377 A1* | 3/2017 | Herdrich | H04L 43/10 |
| 2018/0075106 A1 | 3/2018 | Haver et al. | |
| 2018/0091387 A1 | 3/2018 | Levi et al. | |
| 2019/0215305 A1* | 7/2019 | Monshizadeh | H04L 63/0236 |
| 2020/0021994 A1* | 1/2020 | Ranjbar | H04W 12/1204 |
| 2020/0037209 A1* | 1/2020 | Mihaly | H04L 67/1021 |

OTHER PUBLICATIONS

Extended European Search Report for Application No. EP19197201.7, dated Jan. 20, 2020, 14 pages.

* cited by examiner

SYSTEMS AND METHODS FOR NON-INTRUSIVE NETWORK PERFORMANCE MONITORING

BACKGROUND

Packet switching is a method of grouping data which is transmitted over a digital network into packets which are made of a header and a payload. Data in the header may be used by network devices to direct packets to destinations where the payload may be used as part of a service.

SUMMARY

According to some possible implementations, a first network device may include one or more memories and one or more processors, to: select a packet that is part of the traffic flow based on a rule. The one or more processors may generate a packet replica of the packet that has been selected. The one or more processors may add, to the packet replica, routing information that is capable of being used to generate network performance indicators associated with the IP session. The one or more processors may modify a portion of the packet replica to include one or more values that will cause the packet replica to fail to reach a destination device associated with the IP session. The one or more processors may provide the packet replica to one or more other network devices to cause a second network device, of the one or more other network devices, to perform a validation procedure to determine that the packet replica is unable to be validated based on the one or more values included in the packet replica, generate or cause another device to generate the network performance indicators using the packet replica or a group of packet replicas that have been modified, and provide or cause the other device to provide the network performance indicators to a particular device.

According to some possible implementations, a method may include receiving, by a first network device, packets as part of a traffic flow of an internet protocol (IP) session. The method may include selecting, by the first network device, a packet that is part of the traffic flow. The method may include generating, by the first network device, a packet replica of the packet that has been selected. The method may include adding, by the first network device and to the packet replica, routing information that is capable of being used to generate network performance indicators associated with the IP session. The method may include modifying, by the first network device, the packet replica to include one or more values that will cause the packet replica to fail to reach a destination device associated with the IP session. The method may include providing, by the first network device and as part of the traffic flow of the IP session, the packet replica to one or more other network devices to cause a second network device, of the one or more other network devices, to remove the packet replica from the traffic flow of the IP session based on the packet replica including the one or more values that have been modified, and to perform one or more actions that cause the network performance indicators to be generated and provided to another device.

According to some possible implementations, a non-transitory computer-readable medium may store instructions that include one or more instructions that, when executed by one or more processors of a network device, cause the one or more processors to receive, from another network device, a packet replica as part of a traffic flow of an internet protocol (IP) session. The packet replica may include routing information capable of being used to generate network performance indicators associated with the IP session. The packet replica may have been modified to include one or more values that will cause the packet replica to fail to reach a destination device associated with the IP session. The one or more instructions may cause the one or more processors to perform a validation procedure by processing the packet replica. The packet replica may fail the validation procedure based on the one or more values included in the packet replica. The one or more instructions may cause the one or more processors to identify the routing information included in the packet replica based on the packet replica failing the validation procedure. The one or more instructions may cause the one or more processors to generate the network performance indicators using the packet replica or a group of packet replicas that have been modified and received over time. The one or more instructions may cause the one or more processors to provide the network performance indicators to a particular device.

DETAILED DESCRIPTION

Figure 1A:
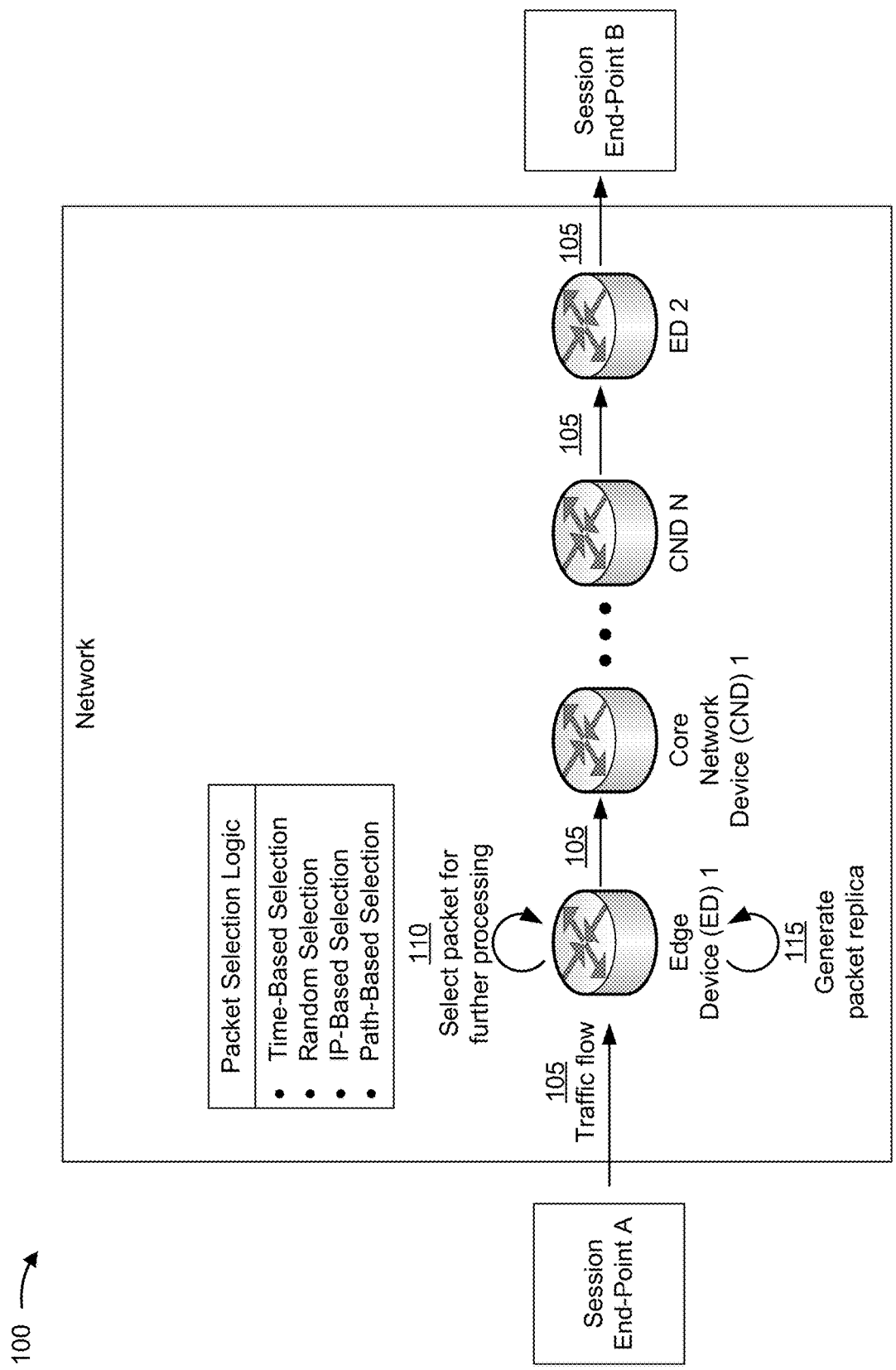
FIGS. 1A-1C are diagrams of an example implementation described herein.

The following detailed description of example implementations refers to the accompanying drawings. The same reference numbers in different drawings may identify the same or similar elements.

A packet switched network may include network devices (e.g., switches, routers, and/or the like) that may send and/or receive packets as part of traffic flow of a session (e.g., an internet protocol (IP) session) for a service. In some cases, network congestion may cause the network devices to drop packets or to delay packet transmission of the packets. Additionally, paths through the packet switched network may change because of hardware failures and/or software failures associated with the network devices.

When a service is offered over the packet switched network, key performance metrics (referred to herein as network performance indicators) may be agreed upon between a network service provider and a customer. For example, a service-level agreement (SLA) between the network service provider and the customer may include stipulations that certain network performance indicators are to be monitored and/or satisfied (e.g., network devices may need to adhere to threshold levels of performance to be in compliance with terms of the SLA).

In some cases, to test the network performance indicators, the network service provider may configure the network devices to generate and transmit synthetic probe packets throughout the packet switched network and may process the synthetic probe packets to determine the network performance indicators.

However, the synthetic probe packets may be an ineffective solution for testing network performance indicators because the synthetic probe packets may display different forwarding behavior than packets of actual traffic flow of the IP session. For example, the synthetic probe packets may have different IP addresses than the packets of the actual traffic flow of the IP session (e.g., a different source IP address, a different destination IP address, etc.), may be a different packet size (e.g., in bytes) than the packets of the actual traffic flow of the IP session, may take different paths through the packet switched network than the packets of the actual traffic flow of the IP session, and/or the like. Other solutions may rely on changes to a forwarding plane of one or more network devices used to route the actual traffic flow of the IP session (e.g., by adding additional headers to the packets that are part of the actual traffic flow of the IP session). These solutions may be disruptive and difficult to implement in existing packet switched networks.

Some implementations described herein provide a first network device to generate packet replicas of packets that are part of a traffic flow of an IP session, and to intelligently modify the packet replicas such that a second network device will be able to use the packet replicas to generate network performance indicators associated with the IP session. For example, the first network device may receive packets as part of the traffic flow of the IP session, and may a select packet for further processing. The packet selected by may be part of a group of packets that are selected for further processing. In this case, the first network device may generate a packet replica of the packet, and may add, to the packet replica, routing information (e.g., segment routing operations, administration, and maintenance (OAM) information) that may be used to generate the network performance indicators.

Additionally, the first network device may modify the packet replica to include one or more values that will cause the packet replica to fail to reach a destination device associated with the IP session (e.g., by modifying a value in a header of the packet replica, such that the second network device is unable to validate the packet replica as a result of the modification). Furthermore, the first network device may provide the packet replica to one or more other network devices (e.g., downstream network devices) as part of the traffic flow of the IP session.

Furthermore, the packet replica may be provided to the second network device, which may perform a validation procedure on the packet replica and determine that the packet replica is unable to be validated. The packet replica may fail the validation procedure based on the modifications made to the packet replica by the first network device. This may cause the second network device to remove the packet replica from the traffic flow of the IP session. Additionally, the second network device may generate the network performance indicators using the packet replica (or a group of packet replicas that have been received over time) and may provide the network performance indicators to a network performance management platform that may be tasked with providing proof of compliance to various terms of an SLA.

In this way, the first network device and/or the second network device efficiently and effectively orchestrate accurate monitoring and reporting of network performance associated with the IP session. For example, by creating packet replicas that include the same IP address information as packets that are part of the traffic flow of the IP session, the first network device improves accuracy of the network performance indicators by enabling the packet replicas to exhibit the same forwarding behavior as the packets that are part of the traffic flow of the IP session. Additionally, using packet replicas to determine network performance indicators conserves resources (e.g., processing resources, network resources, and/or the like) relative to a solution that requires modifying a forwarding plane of one or more network devices. For example, using the packet replicas to determine the network performance indicators may conserve resources that might be expended modifying a forwarding plane configuration, resources spent processing new headers that are added to every packet that would be part of traffic flow of an IP session, and/or the like.

Figure 1B:
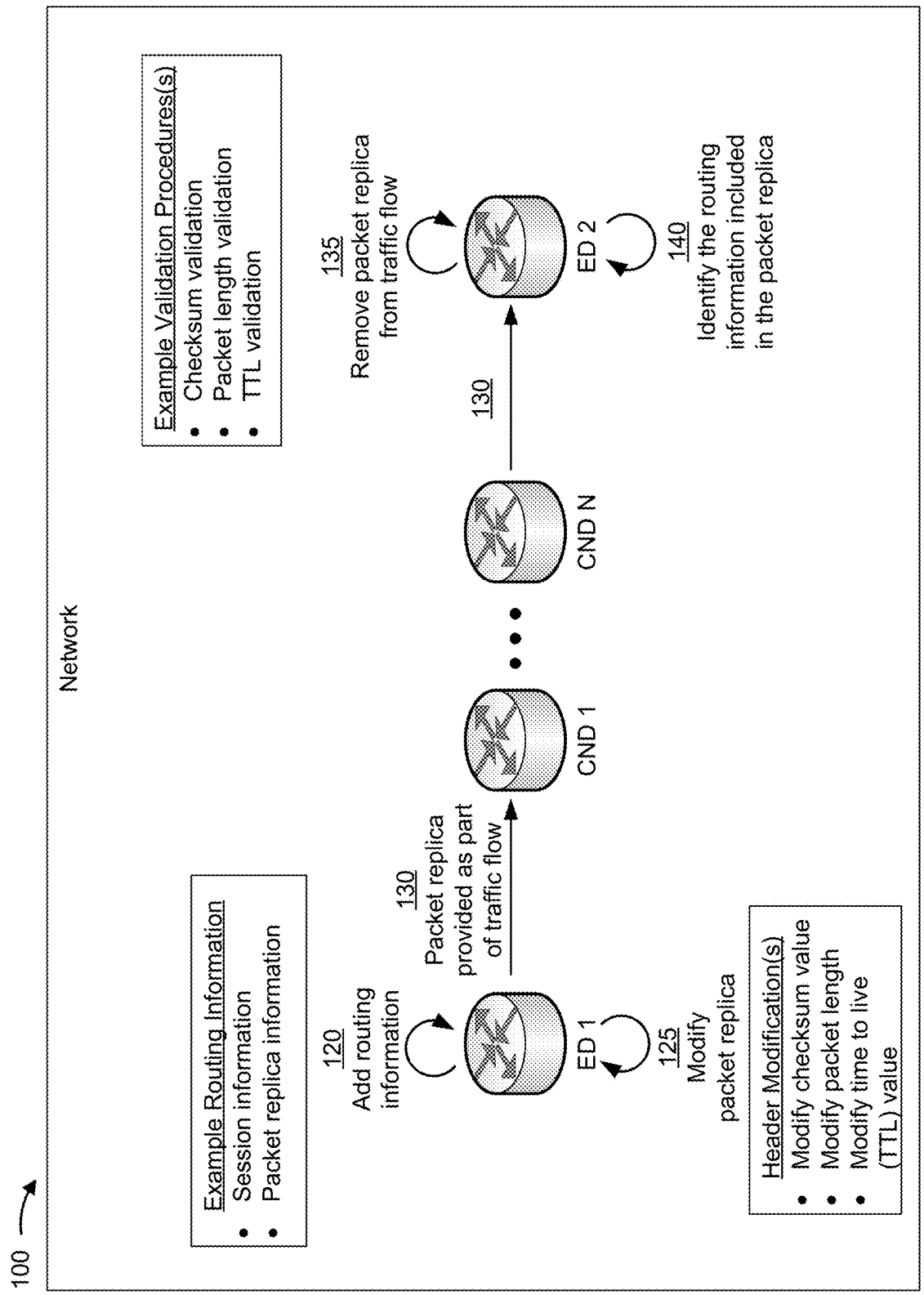
Figure 1C:
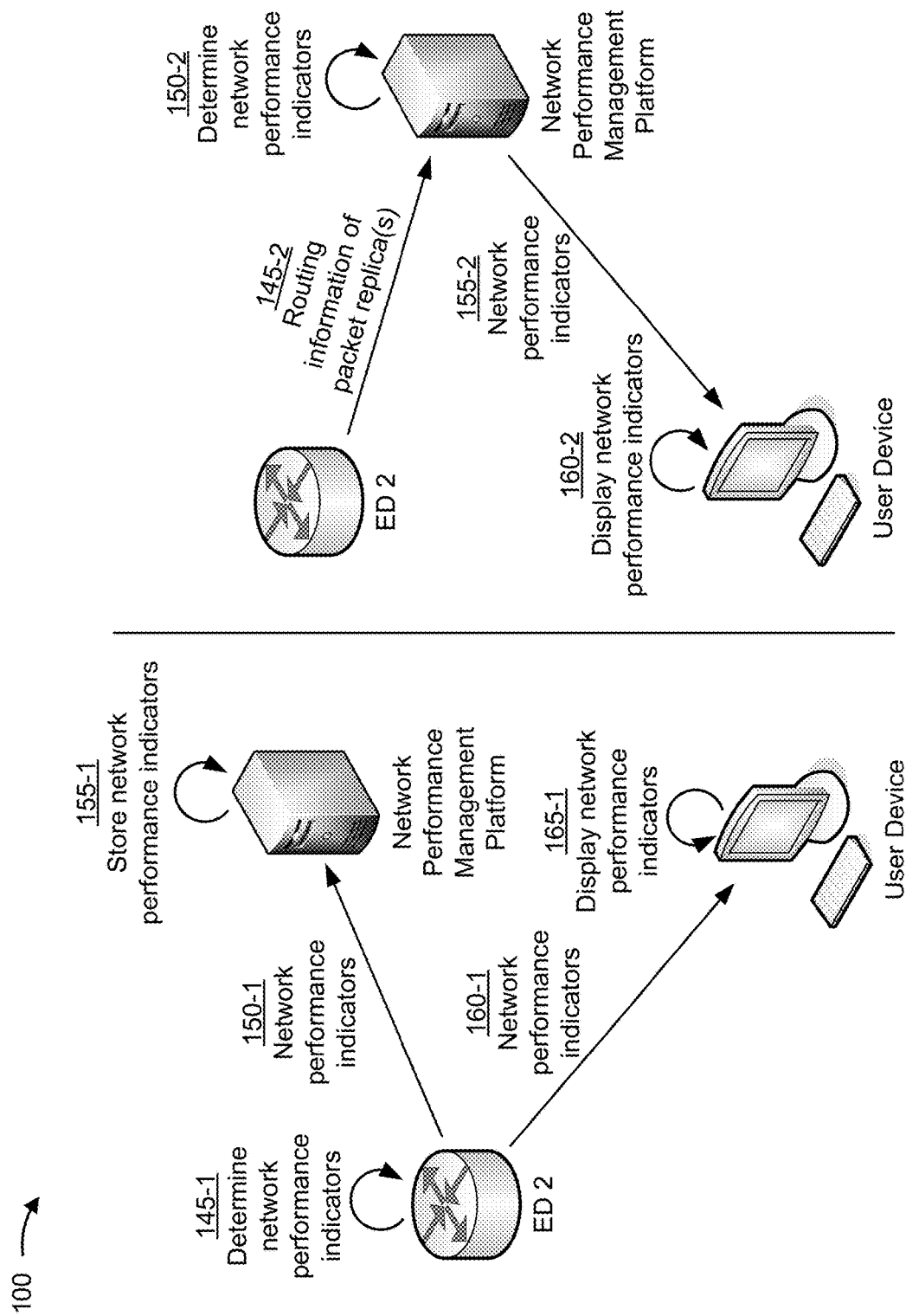

FIGS. 1A-1C are diagrams of an example implementation 100 described herein. For example, example implementation 100 may include a first session end-point for an internet protocol (IP) session (shown as Session End-Point A), a second session end-point for the IP session (shown as Session End-Point B), a group of network devices that are part of a network that is to be used to route traffic flow of the IP session and generate and/or report network performance indicators associated with the IP session, and one or more devices that may receive the network performance indicators (shown as a Network Performance Management Platform and a User Device). The group of network devices may include a first edge device (e.g., shown as Edge Device (ED) 1), core network devices (e.g., shown as Core Network Device (CND) 1 through CND N), and a second edge device (e.g., shown as ED 2). While not shown, in other cases, customer equipment may serve as intermediary devices between session end-points and edge devices of the network, and may assist in routing the traffic flow of the IP session.

As shown in FIG. 1A, and by reference number 105, packets that are part of the traffic flow of the IP session may be routed between the first session end-point and the second session end-point via the network. The packets that are part of the IP session may be IP version 4 (IPv4) packets, IP version 6 (IPv6) packets, and/or the like.

The network may be a packet switched network, and the group of network devices that are part of the network may route the traffic flow using a tunneling technique, such as a generic routing encapsulation (GRE) technique, a multiprotocol label switching (MPLS) technique (e.g., an MPLS technique using user datagram protocol (UDP), an MPLS technique using GRE, and/or the like), a virtual extensible local area network (VXLAN) technique (e.g., using the generic protocol extension (GPE)), a generic network virtualization encapsulation (GENEVE) technique, and/or the like. Additionally, while the group of network devices described herein may be said to be routing layer 3 (L3) traffic, it is to be understood that this is provided by way of example. In practice, the group of network devices may be used to route layer 2 (L2) traffic or other types of traffic.

As shown by reference number 110, the first edge device may select a packet that is part of the traffic flow for further processing. For example, the first edge device may select the packet to be used to generate a packet replica, which may be then used by one or more other devices to determine the network performance indicators associated with the IP session, as described further herein. Additionally, while FIG. 1A shows selection of a single packet, the first edge device may periodically select packets over time, such that a sampling of packets is collected and able to be used to generate a set of packet replicas.

In some implementations, the first edge device may select the packet based on a rule. The rule may include a first rule indicating to periodically select packets after a threshold time period (e.g., by selecting a first packet received after the threshold time period passes), a second rule indicating to randomly select packets (e.g., by randomly selecting a time until a next incoming packet is to be selected, by randomly selecting a number that indicates a number of incoming packets that are to be received before a packet is selected, and/or the like), a third rule indicating to select packets that include a particular IP address and/or identifier (e.g., a port identifier, a protocol identifier, and/or the like), a fourth rule indicating to select packets based on a routing or forwarding path of the packets, and/or the like.

To provide a few examples, assume that over time (e.g., several seconds, minutes, hours, etc.), a thousand packets are sent to the first edge device as part of the traffic flow of the IP session. In this example, if the first edge device is configured with the first rule, the first edge device may select a packet after a threshold time period passes (e.g., a millisecond, a second, etc.). As another example, assume the first edge device is configured with the second rule indicating to randomly select packets. In this example, the first edge device may use a random number generator to generate a random number (e.g., five) which may dictate the next packet that is selected (e.g., the first edge device may wait five seconds and select the next packet received, the first edge device may select a fifth incoming packet, and/or the like). In this way, the first edge device conserves processing resources and/or network resources relative to selecting and generating packet replicas of every packet that is part of the traffic flow of the IP session.

As shown by reference number 115, the first edge device may generate a packet replica of the packet. For example, the first edge device may generate a packet replica of the packet that has identical values and/or properties as the packet. To provide a few examples, an IP address used for the packet may be the same IP address used for the packet replica, the packet and the replica packet may be the same size or length, the payload of the packet and the packet replica may include the same data, and/or the like.

In this way, as the traffic flow of the IP session is being routed through the network, the first edge device is able to select packets that are part of the traffic flow, and to generate packet replicas of the selected packets for further processing, as described further herein.

As shown in FIG. 1B, and by reference number 120, the first edge device may add routing information to the packet replica. For example, the first edge device may add routing information (e.g., routing operations, administration, and maintenance (OAM) information) to a payload of the packet replica (e.g., by overriding the payload which is a copy of the payload of the original packet). Additionally, or alternatively, the first edge device may add a new header (e.g., a transport header) to the packet replica and may include the routing information in the new header.

The routing information may include any information that may be available to the first edge device and that may be used by other network devices for determining network performance indicators (e.g., latency, jitter, packet loss, and/or the like). For example, the routing information may include session information for the IP session, packet replica information for packet replicas sent through the network as part of the IP session, and/or the like.

The session information may include a session identifier of the IP session, a start time for the session, a total time the session has been active, a customer identifier associated with the IP session, and/or the like. The packet replica information may include a packet sequence identifier for a packet replica (e.g., which may be used to determine a sequence in which packet replicas are sent or received), a packet time stamp (e.g., indicating a time a packet replica is sent or received by a network device, one or more interface identifiers (e.g., indicating an interface a packet replica is sent from or received at), a path identifier that identifies a path used to route or forward the packet replica within the network (e.g., by identifying particular network devices or components of network devices that the packet replica traveled through), and/or the like.

As shown by reference number 125, the first edge device may modify the packet replica. For example, the first edge device may modify a header of the packet replica to include one or more values that will cause the packet replica to fail to reach the second session end-point (e.g., Session End-Point B). In this case, the second edge device (e.g., Edge Device 2) may be configured to attempt to validate all packets that are part of the traffic flow of the IP session, and may be able unable to validate the packet replica based on the one or more values that are modified in the header, as described further herein.

In some implementations, the first edge device may modify a checksum value in the header of the packet replica. For example, if the packet replica is an IPv4 packet, the first edge device may set an IPv4 header checksum value to an incorrect value that may cause a checksum validation error when the packet replica is processed by the second edge device.

Additionally, or alternatively, the first edge device may modify a packet length value in the header of the packet replica. For example, the first edge device may set a packet length value to an incorrect value that does not match an actual length of the packet replica. This may cause a packet length validation error when the packet replica is processed by the second edge device.

Additionally, or alternatively, the first edge device may modify a time to live (TTL) value in the header of the packet replica. For example, the first edge device may set a TTL value to a particular value (e.g., 0, 1, etc.) that may trigger a validation error when the packet replica is processed by second edge device.

As shown by reference number 130, the first edge device may provide the packet replica to a first core network device as part of the traffic flow of the IP session. For example, the first edge device may use a forwarding plane for determining how to route the traffic flow of the IP session (e.g., which may indicate that a next hop is the first core network device). This may cause the packet replica to be routed through the network, to the second edge device, using a path that is also used by the packets that are part of the traffic flow of the IP session.

As shown by reference number 135, the second edge device may remove the packet replica from the traffic flow of the IP session. For example, the second edge device may remove the packet replica from the traffic flow of the IP session based on determining that the packet replica does not conform to one or more requirements of a validation procedure. In this case, the second edge device may perform a validation procedure on the packet replica, and the packet replica may fail the validation procedure based on the modifications that were made to the header of the packet replica.

As an example, assume the first edge device modified a checksum value in the header of the packet replica. In this example, the second edge device may perform a checksum validation procedure by comparing the checksum value to a configured checksum value. If the checksum value and the configured checksum value do not match, the second edge device may generate a validation error, increment an error counter, and/or the like, which may cause the second edge device to remove the packet replica from the traffic flow of the IP session.

As another example, assume the first edge device modified a packet length value in the header of the packet replica. In this example, the second edge device may perform a packet length validation procedure that involves processing the packet replica to generate a value identifying an actual packet length, and comparing the value identifying the actual packet length to the packet length value included in the header. If the value identifying the actual packet length does not match the packet length value in the header, the second edge device may generate a validation error, increment an error counter, and/or the like, which may cause the second edge device to remove the packet replica from the traffic flow of the IP session.

As another example, assume the first edge device modified a TTL value in the header of the packet replica. In this example, the second edge device may perform a TTL validation procedure that involves processing the packet replica to determine that the TTL value satisfies an error threshold (e.g., a value of 0, a value of 0 or 1, etc.). If the TTL value satisfies the error threshold, the first edge device may generate a validation error, increment an error counter, perform a protocol-specific action (e.g., send a message, such as an internet control message protocol (ICMP) TTL expiry message, to a source device), and/or the like. This may cause the second edge device to remove the packet replica from the traffic flow of the IP session.

As shown by reference number 140, the second edge device may identify the routing information included in the packet replica. For example, the second edge device may identify the routing information after removing the packet replica from the traffic flow, after the packet replica fails the validation procedure, and/or the like. In this case, the second edge device may be configured to identify values that are not typically included in the packets that are part of the traffic flow of the IP session. As such, the second edge device may identify the routing information by processing the new header of the packet replica or the payload of the packet replica. This may allow the second edge device to use the routing information to generate or cause another device to generate the network performance indicators, as described further herein.

By adding the routing information to the packet replica, the first network device ensures that the packet replica includes information that will be needed to monitor network performance. Furthermore, by modifying one or more values of the packet replica, the first edge device ensures that the second network device will detect and remove the packet replica from the traffic flow of the IP session, thereby preventing the packet replica from interfering with the IP session by reaching the second session end-point.

As shown in FIG. 1C, the second edge device, or the network performance management platform, may be configured to determine the network performance indicators. For example, and as shown by reference number 145-1, the second edge device may determine the network performance indicators (e.g., latency, jitter, packet loss, packet delay, and/or the like) by processing the routing information of the packet replica or a group of packet replicas that are identified over a particular time period.

In some implementations, the second edge device may determine latency for the packet replica or the group of packet replicas. For example, the second edge device may determine latency for the packet replica from a first network device to a second network device (e.g., from the first edge device to the first core network device, from the first edge device to the second edge device, and/or the like). In this case, the second edge device may determine the latency by calculating a time needed for the packet replica to be provided from the first network device to the second network device. In some cases, the second edge device may send the packet replica (or the group of packet replicas) back to the second network device, such that latency may be measured by considering a round trip time (RTT) of the packet replica (or the group of packet replicas).

Additionally, or alternatively, the second edge device may determine jitter for the packet replica or the group of packet replicas. For example, the second edge device may determine jitter for the group of packet replicas as the group of packet replicas travel from a first network device to a second network device. In this case, the second edge device may determine jitter by calculating a variance in the latency of the group of packet replicas.

Additionally, or alternatively, the second edge device may determine packet loss or packet delay for the packet replica or the group of packet replicas. For example, if the routing information for each packet replica indicates a packet sequence number, the second edge device may determine packet loss by identifying whether packet replicas are missing (e.g., based on the group of packet replicas including some, but not all, of the packet sequence numbers). A similar technique may be implemented to determine packet delay.

As shown by reference number 150-1, the second edge device may provide the network performance indicators to the network performance management platform. For example, the second edge device may use a communication interface (e.g., an application programming interface (API) or another type of interface) to provide the network performance indicators to the network performance management platform. As shown by reference number 155-1, the network performance management platform may store the network performance indicators.

As shown by reference number 160-1, the second edge device may provide the network performance to the user device. For example, the second edge device may use a communication interface (e.g., an application programming interface (API) or another type of interface) to provide the network performance indicators to the user device. The user device may be a device of an organization providing network services, a device of an organization using the network services, and/or the like.

As shown by reference number 165-1, a user interface of the user device my display the network performance indicators. This may allow users to identify network performance indicators, to verify whether the traffic flow of the IP session is in conformance with a service-level agreement (SLA) (which may specify certain threshold performance metrics that are to be satisfied), and/or the like.

In some implementations, assume the network performance management platform is configured to determine the network performance indicators. In this case, and as shown by reference number 145-2, the second edge device may provide, to the network performance management platform, the routing information for the packet replica or for a group of packet replicas. As an example, the second edge device may be configured to provide the routing information for packet replicas as soon as the routing information is identified. As another example, the second edge device may be configured to periodically provide routing information for a group of packet replicas that have been identified over time.

As shown by reference number 150-2, the network performance management platform may determine the network performance indicators. For example, the network performance management platform may determine latency, jitter, packet loss, packet delay, and/or the like, in a manner described above.

As shown by reference number 155-2, the network performance management platform may provide the network performance to the user device. For example, the network performance management platform may use the communication interface to provide the network performance indicators to the user device. As shown by reference number 165-2, the user interface of the user device may display the network performance indicators.

In some implementations, the second edge device and/or the network performance management platform may perform one or more actions associated with assisting in reporting and/or improving network performance. For example, the second edge device and/or the network performance management platform may be configured to automatically generate and provide, to a device associated with the network service provider and/or a device associated with the customer, a notification indicating that one or more terms of a service-level agreement (SLA) are not presently satisfied. In some cases, the notification may be generated and provided based on a network performance indicator satisfying a threshold level of performance (e.g., a level associated with poor performance, a level that allows the network service provider to fix a performance problem prior to breaching the SLA, and/or the like).

Additionally, or alternatively, the second edge device and/or the network performance management platform may be configured to generate instructions to repair an error (e.g., a hardware error, a software error, etc.) that is affecting network performance and/or to automatically repair the error. For example, the second edge device may use the routing information to identify an error that is likely to be a cause of poor network performance. In this case, the second edge device may be configured with rules that associate particular errors with particular actions, and may reference the rules to determine a particular action to perform or to recommend that another device perform.

In this way, the first network device and/or the second network device efficiently and effectively orchestrate accurate monitoring and reporting of network performance. For example, by creating packet replicas that include the same IP address information as packets that are part of the traffic flow of the IP session, the first network device improves accuracy of the network performance indicators by enabling the packet replicas to exhibit the same forwarding behavior as the packets that are part of the traffic flow of the IP session.

As indicated above, FIGS. 1A-1C are provided merely as an example. Other examples are possible and may differ from what was described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementations 100 may perform one or more functions described as being performed by another set of devices of example implementations 100.

Figure 2:
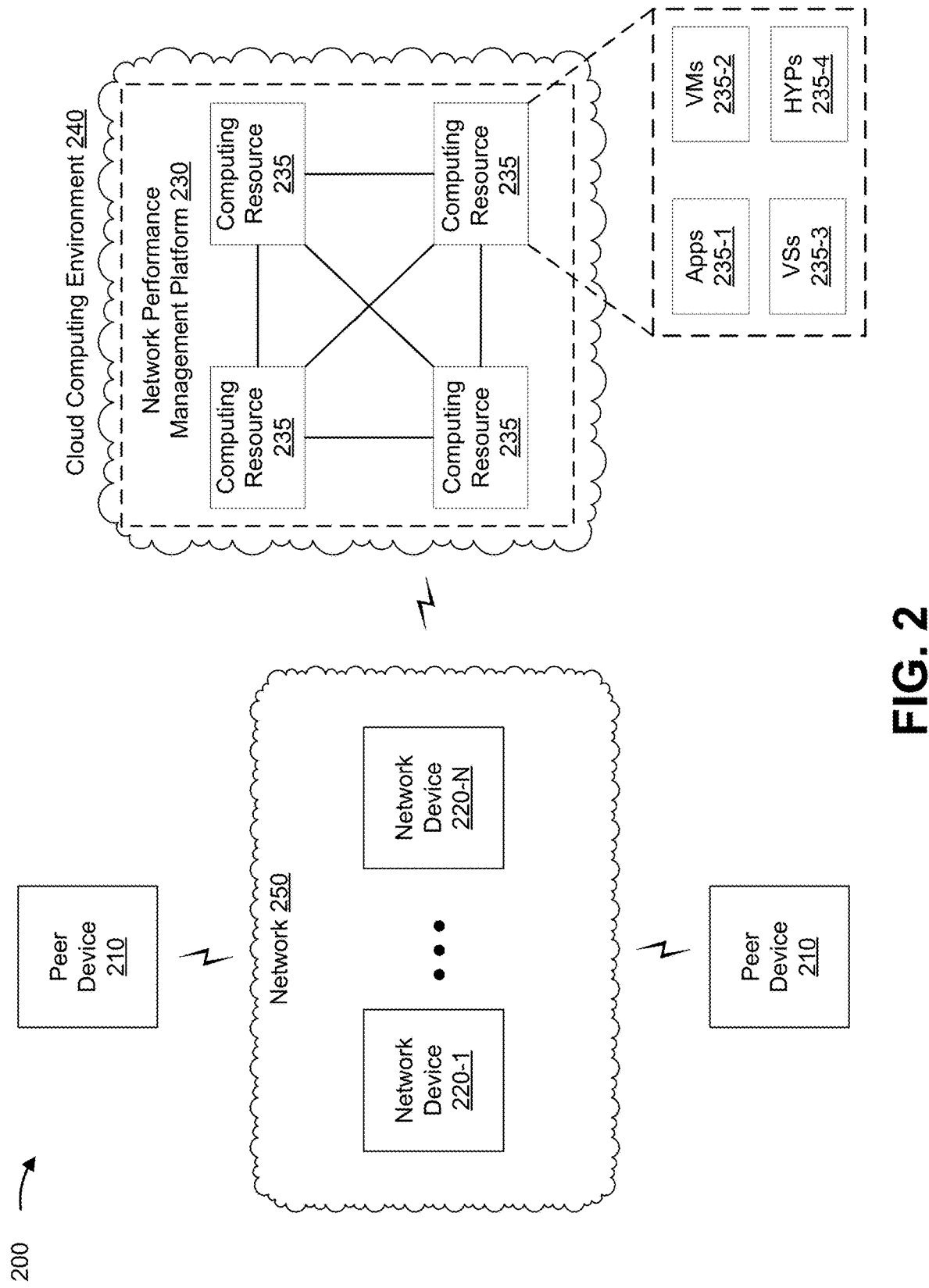
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more peer devices 210, a group of network devices 220 (shown as Network Device 220-1 through Network Device 220-N), a network performance management platform 230, and/or a network 250. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. Additionally, or alternatively, peer device 210 may include an endpoint device that is a source or a destination for network traffic. For example, peer device 210 may include a computer or a similar type of device. Peer device 210 may receive network traffic from and/or may provide network traffic to other peer devices 210 via network 250 (e.g., by routing packets using network device(s) 220 as an intermediary). In some implementations, peer device 210 may provide traffic flow of an internet protocol (IP) session to network device 220 (e.g., an edge device in a network, a core network device, and/or the like).

Network device 220 includes one or more devices capable of receiving, processing, storing, routing, and/or providing traffic (e.g., a packet, a packet replica, other information or metadata, and/or the like) in a manner described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis.

In some implementations, network device 220 may be a virtual device implemented by one or more computer devices of a cloud computing environment or a data center. In some implementations, a group of network devices 220 may include a first network device 220, one or more core network devices 220, a second network device 220, and/or the like. In some implementations, network device 220 may route the traffic flow using a tunneling technique, such as a generic routing encapsulation (GRE) technique, a multiprotocol label switching (MPLS) technique (e.g., an MPLS technique using user datagram protocol (UDP), an MPLS technique using GRE, and/or the like), a virtual extensible local area network (VXLAN) technique (e.g., using the generic protocol extension (GPE)), a generic network virtualization encapsulation (GENEVE) technique, and/or the like.

Network performance management platform 230 includes one or more devices capable of receiving, storing, processing, generating, and/or providing information associated with network performance indicators. For example, network performance management platform 230 may include a server device (e.g., a host server, a web server, an application server, etc.), a data center device, or a similar device.

In some implementations, as shown, network performance management platform 230 may be hosted in cloud computing environment 240. Notably, while implementations described herein describe network performance management platform 230 as being hosted in cloud computing environment 240, in some implementations, network performance management platform 230 may not be cloud-based (i.e., may be implemented outside of a cloud computing environment) or may be partially cloud-based.

Cloud computing environment 240 includes an environment that hosts network performance management platform 230. Cloud computing environment 240 may provide computation, software, data access, storage, etc. services that do not require end-user knowledge of a physical location and configuration of system(s) and/or device(s) that hosts network performance management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host network performance management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by another device described herein. Application 235-1 may eliminate a need to install and execute the software applications on these devices. For example, application 235-1 may include software associated with network performance management platform 230 and/or any other software capable of being provided via cloud computing environment 240. In some implementations, one application 235-1 may send/receive information to/from one or more other applications 235-1, via a virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device, and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
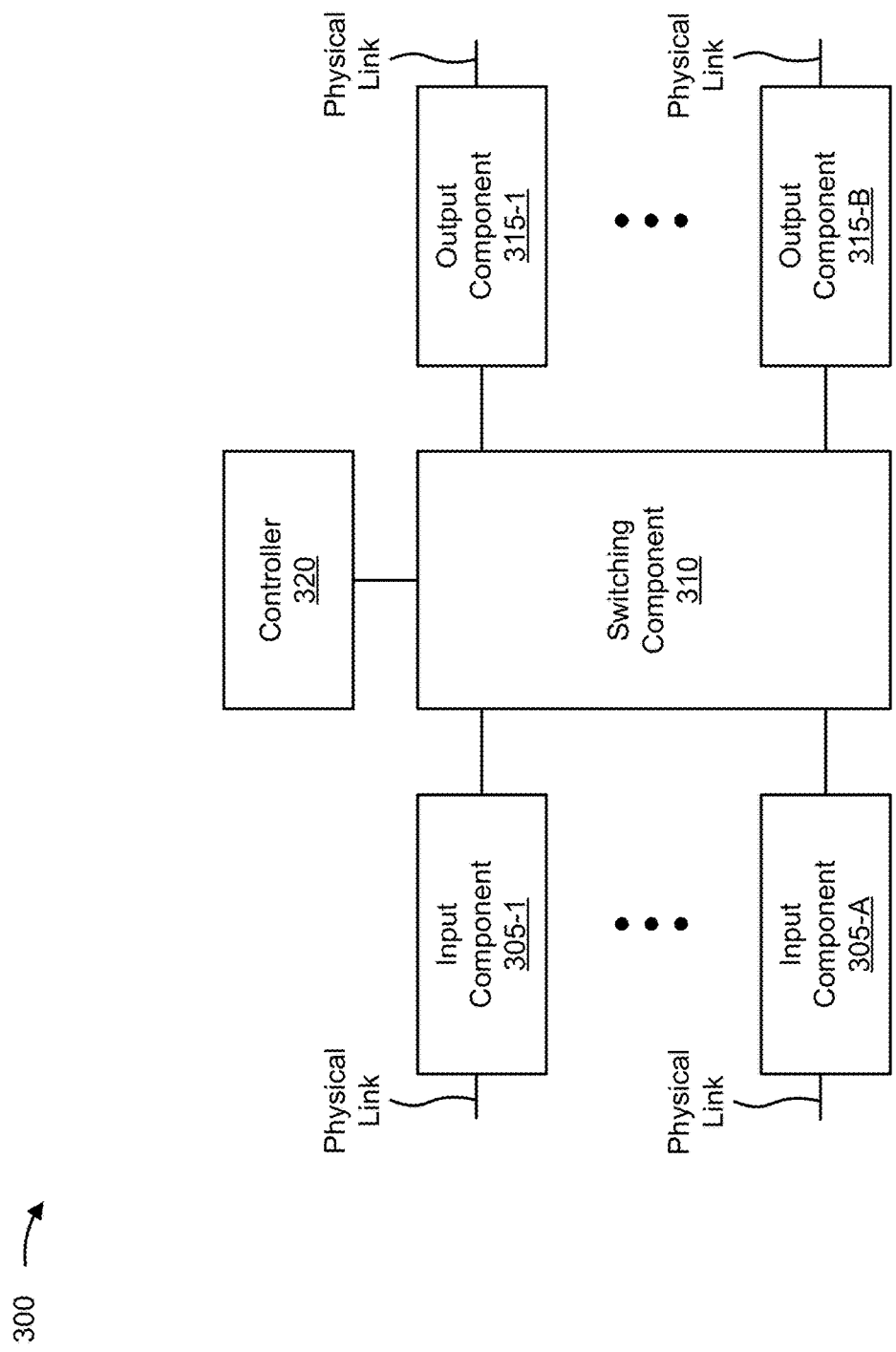
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of software and hardware. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection (e.g., BFD) session, and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
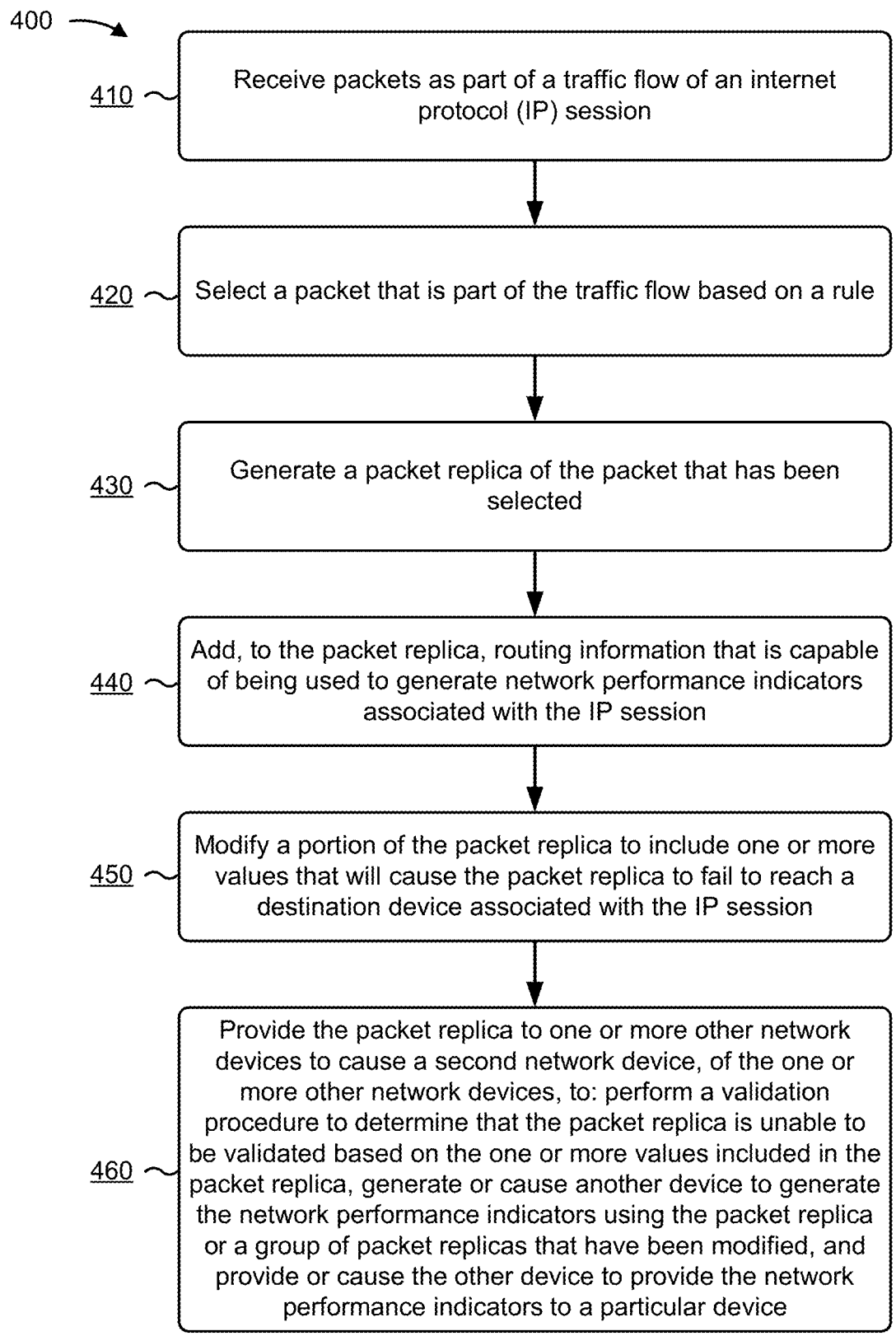
FIGS. 4-6 are flow charts of an example process for non-intrusive monitoring of network performance of a group of network devices used to support traffic flow of an internet protocol (IP) session.

FIG. 4 is a flow chart of an example process 400 for non-intrusive monitoring of network performance of a group of network devices used to support traffic flow of an internet protocol (IP) session. In some implementations, one or more process blocks of FIG. 4 may be performed by a first network device (e.g., network device 220). In some implementations, one or more process blocks of FIG. 4 may be performed by another device or a group of devices separate from or including the first network device, such as a peer device (e.g., peer device 210), one or more other network devices 220, such as a second network device, a network performance management platform (e.g., network performance management platform 230), a computing resource (e.g., computing resource 235), and/or the like.

As shown in FIG. 4, process 400 may include receiving packets as part of a traffic flow of an internet protocol (IP) session (block 410). For example, the first network device (e.g., using input component 305, switching component 310, controller 320, and/or the like) may receive packets as part of a traffic flow of an internet protocol (IP) session, as described above with regard to FIGS. 1A-1C.

As further shown in FIG. 4, process 400 may include selecting a packet that is part of the traffic flow based on a rule (block 420). For example, the first network device (e.g., using input component 305, switching component 310, controller 320, and/or the like) may select a packet that is part of the traffic flow based on a rule, as described above with regard to FIGS. 1A-1C.

As further shown in FIG. 4, process 400 may include generating a packet replica of the packet that has been selected (block 430). For example, the first network device (e.g., using switching component 310, output component 315, controller 320, and/or the like) may generate a packet replica of the packet that has been selected, as described above with regard to FIGS. 1A-1C.

As further shown in FIG. 4, process 400 may include adding, to the packet replica, routing information that is capable of being used to generate network performance indicators associated with the IP session (block 440). For example, the first network device (e.g., using switching component 310, output component 315, controller 320, and/or the like) may add, to the packet replica, routing information that is capable of being used to generate network performance indicators associated with the IP session, as described above with regard to FIGS. 1A-1C.

As further shown in FIG. 4, process 400 may include modifying a portion of the packet replica to include one or more values that will cause the packet replica to fail to reach a destination device associated with the IP session (block 450). For example, the first network device (e.g., using switching component 310, output component 315, controller 320, and/or the like) may modify a portion of the packet replica to include one or more values that will cause the packet replica to fail to reach a destination device associated with the IP session, as described above with regard to FIGS. 1A-1C.

As further shown in FIG. 4, process 400 may include providing the packet replica to one or more other network devices to cause a second network device, of the one or more other network devices, to: perform a validation procedure to determine that the packet replica is unable to be validated based on the one or more values included in the packet replica, generate or cause another device to generate the network performance indicators using the packet replica, and provide or cause the other device to provide the network performance indicators to a particular device (e.g., (block 460). For example, the first network device (e.g., using switching component 310, output component 315, controller 320, and/or the like) may provide the packet replica to one or more other network devices to cause a second network device, of the one or more other network devices, to perform a validation procedure to determine that the packet replica is unable to be validated based on the one or more values included in the packet replica, generate or cause another device to generate the network performance indicators using the packet replica, and provide or cause the other device to provide the network performance indicators to a particular device, as described below and as described above with regard to FIGS. 1A-1C.

Process 400 may include additional implementations, such as any single implementation or any combination of implementations described below and/or in connection with one or more other processes described elsewhere herein.

In some implementations, a forwarding plane of the first network device may not be modified when modifying the portion of the packet replica. In some implementations, when providing the packet replica to the one or more other network devices, the first network device may provide, to the one or more other network devices, the packet replica as part of the traffic flow of the IP session.

In some implementations, the packet replica or the group of packet replicas may have IP address information that matches the IP address information of the packets that are part of the traffic flow of the IP session. In some implementations, the rule may be a first rule indicating to randomly select particular packets after a threshold time period, a second rule indicating to select the particular packets based on the particular packets including a particular IP address or protocol identifier, or a third rule indicating to select the particular packets based on a routing or forwarding path of the particular packets.

In some implementations, the traffic flow may be supported by a label switching network, and the routing information may include segment routing operations, administration, and maintenance (OAM) information. In some implementations, when modifying the portion of the packet replica, the first network device may set an IP header checksum value to a first incorrect value, set a packet length value to a second incorrect value, or set an IP header time to live (TTL) value to a third incorrect value.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
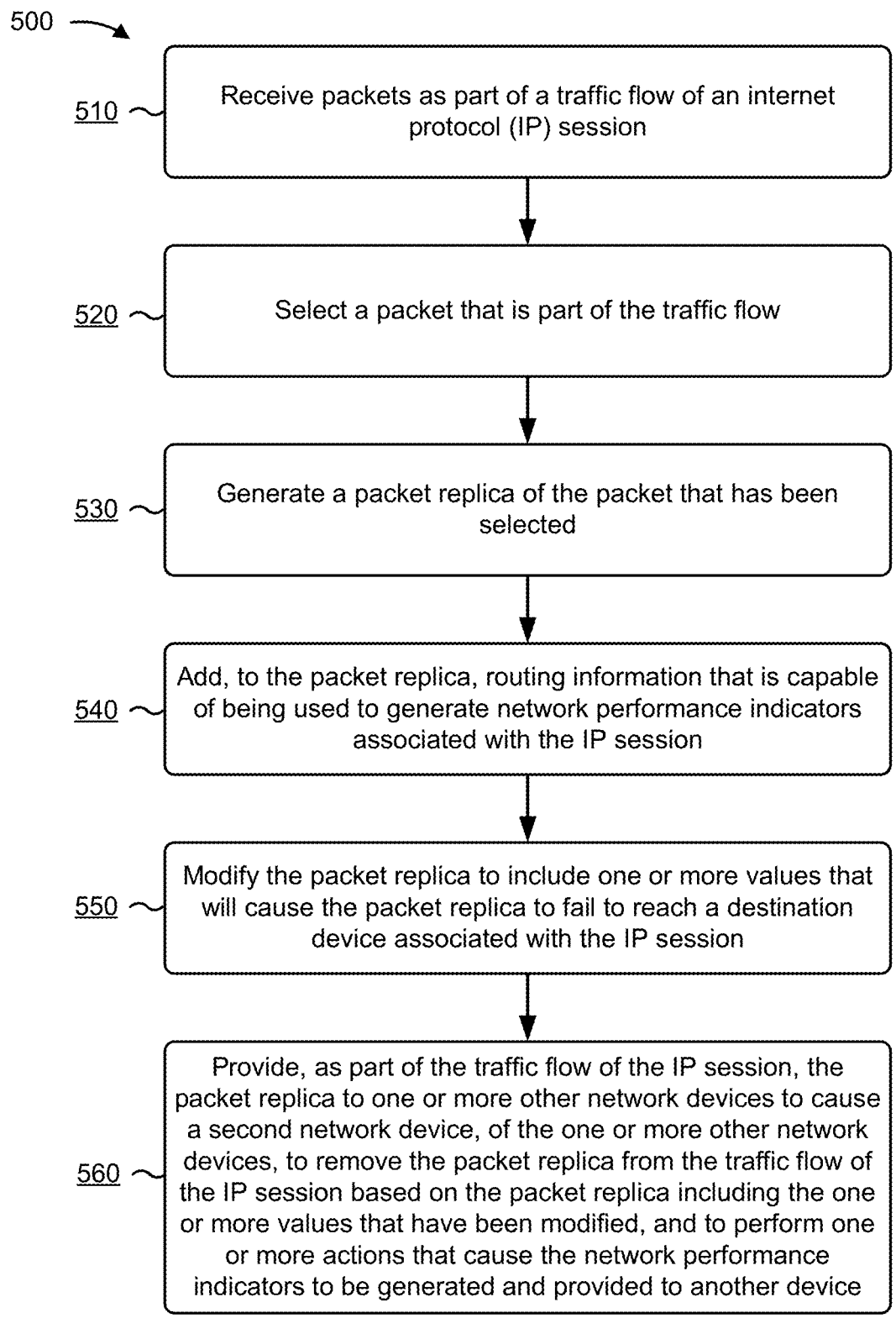

FIG. 5 is a flow chart of an example process 500 for non-intrusive monitoring of network performance of a group of network devices used to support traffic flow of an internet protocol (IP) session. In some implementations, one or more process blocks of FIG. 5 may be performed by a first network device (e.g., network device 220). In some implementations, one or more process blocks of FIG. 5 may be performed by another device or a group of devices separate from or including the first network device, such as a peer device (e.g., peer device 210), a network performance management platform (e.g., network performance management platform 230), a computing resource (e.g., computing resource 235), and/or the like.

As shown in FIG. 5, process 500 may include receiving packets as part of a traffic flow of an internet protocol (IP) session (block 510). For example, the first network device (e.g., using input component 305, switching component 310, controller 320, and/or the like) may receive packets as part of a traffic flow of an internet protocol (IP) session, as described above with regard to FIGS. 1A-1C.

As further shown in FIG. 5, process 500 may include selecting a packet that is part of the traffic flow (block 520). For example, the first network device (e.g., using input component 305, switching component 310, controller 320, and/or the like) may select a packet that is part of the traffic flow, as described above with regard to FIGS. 1A-1C.

As further shown in FIG. 5, process 500 may include generating a packet replica of the packet that has been selected (block 530). For example, the first network device (e.g., using switching component 310, controller 320, and/or the like) may generate a packet replica of the packet that has been selected, as described above with regard to FIGS. 1A-1C.

As further shown in FIG. 5, process 500 may include adding, to the packet replica, routing information that is capable of being used to generate network performance indicators associated with the IP session (block 540). For example, the first network device (e.g., using switching component 310, output component 315, controller 320, and/or the like) may add, to the packet replica, routing information that is capable of being used to generate network performance indicators associated with the IP session, as described above with regard to FIGS. 1A-1C.

As further shown in FIG. 5, process 500 may include modifying the packet replica to include one or more values that will cause the packet replica to fail to reach a destination device associated with the IP session (block 550). For example, the first network device (e.g., using switching component 310, output component 315, controller 320, and/or the like) may modify the packet replica to include one or more values that will cause the packet replica to fail to reach a destination device associated with the IP session, as described above with regard to FIGS. 1A-1C.

As further shown in FIG. 5, process 500 may include providing, as part of the traffic flow of the IP session, the packet replica to one or more other network devices to cause a second network device, of the one or more other network devices, to remove the packet replica from the traffic flow of the IP session based on the packet replica including the one or more values that have been modified, and to perform one or more actions that cause the network performance indicators to be generated and provided to another device (block 560). For example, the first network device (e.g., using switching component 310, output component 315, controller 320, and/or the like) may provide, as part of the traffic flow of the IP session, the packet replica to one or more other network devices to cause a second network device, of the one or more other network devices, to remove the packet replica from the traffic flow of the IP session based on the packet replica including the one or more values that have been modified, and to perform one or more actions that cause the network performance indicators to be generated and provided to another device, as described above with regard to FIGS. 1A-1C.

Process 500 may include additional implementations, such as any single implementation or any combination of implementations described below and/or in connection with one or more other processes described elsewhere herein.

In some implementations, a forwarding plane of the first network device may not be modified when modifying the portion of the packet replica. In some implementations, the network performance indicators may be generated based on the packet replica or a group of packet replicas, and the packet replica or the group of packet replicas may have IP address information that matches the IP address information of the packets that are part of the traffic flow of the IP session.

In some implementations, the first network device may select the packet based on at least one of: a first rule indicating to select particular packets after a threshold time period, a second rule indicating to randomly select the particular packets, a third rule indicating to select the particular packets based on the particular packets including a particular IP address or identifier, or a fourth rule indicating to select the particular packets based on a routing or forwarding path of the particular packets. In some implementations, the routing information may include at least one of: session information for the IP session or packet replica information for the packet replica or the group of packet replicas.

In some implementations, adding the routing information may include adding the routing information to the packet replica as an additional header of the packet replica or as part of a payload of the packet replica. In some implementations, modifying the packet replica may include setting an IP header checksum value to a first incorrect value, setting a packet length value to a second incorrect value, or setting an IP header time to live (TTL) value to a third incorrect value.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
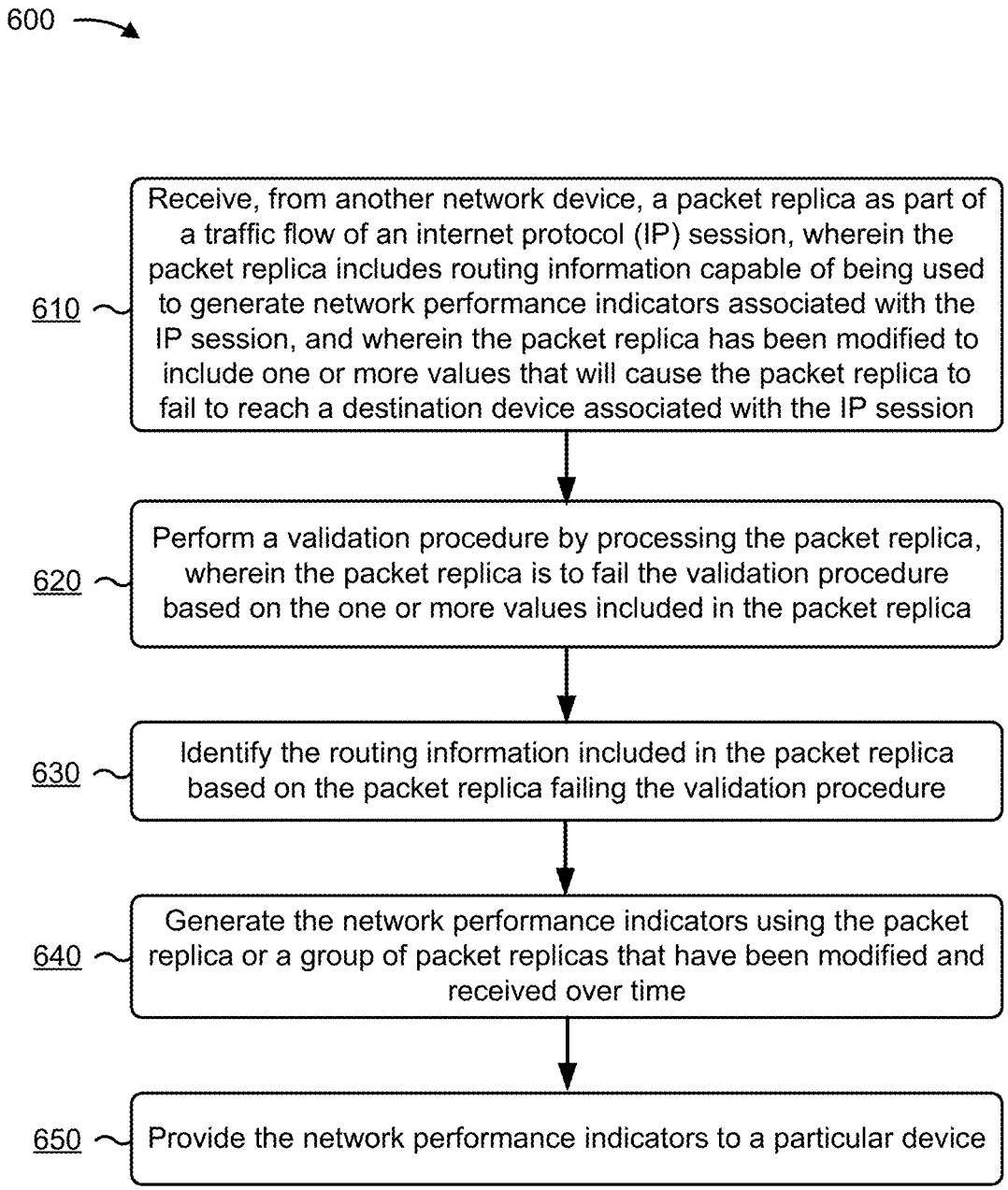

FIG. 6 is a flow chart of an example process 600 for non-intrusive monitoring of network performance of a group of network devices used to support traffic flow of an internet protocol (IP) session. In some implementations, one or more process blocks of FIG. 6 may be performed by a network device (e.g., network device 220). In some implementations, one or more process blocks of FIG. 6 may be performed by another device or a group of devices separate from or including the network device, such as a peer device (e.g., peer device 210), another network device (e.g., a different network device 220), a network performance management platform (e.g., network performance management platform 230), a computing resource (e.g., computing resource 235), and/or the like.

As shown in FIG. 6, process 600 may include receiving, from another network device, a packet replica as part of a traffic flow of an internet protocol (IP) session, wherein the packet replica includes routing information capable of being used to generate network performance indicators associated with the IP session, and wherein the packet replica has been modified to include one or more values that will cause the packet replica to fail to reach a destination device associated with the IP session (block 610). For example, the network device (e.g., using input component 305, switching component 310, controller 320, and/or the like) may receive, from another network device, a packet replica as part of a traffic flow of an IP session, as described above with regard to FIGS. 1A-1C. In some implementations, the packet replica may include routing information capable of being used to generate network performance indicators associated with the IP session, and the packet replica may have been modified to include one or more values that will cause the packet replica to fail to reach a destination device associated with the IP session.

As further shown in FIG. 6, process 600 may include performing a validation procedure by processing the packet replica, wherein the packet replica is to fail the validation procedure based on the one or more values included in the packet replica (block 620). For example, the network device (e.g., using input component 305, switching component 310, controller 320, and/or the like) may perform a validation procedure by processing the packet replica, as described above with regard to FIGS. 1A-1C. In some implementations, the packet replica may fail the validation procedure based on the one or more values included in the packet replica.

As further shown in FIG. 6, process 600 may include identifying the routing information included in the packet replica based on the packet replica failing the validation procedure (block 630). For example, the network device (e.g., using input component 305, switching component 310, controller 320, and/or the like) may identify the routing information included in the packet replica based on the packet replica failing the validation procedure, as described above with regard to FIGS. 1A-1C.

As further shown in FIG. 6, process 600 may include generating the network performance indicators using the packet replica or a group of packet replicas that have been modified and received over time (block 640). For example, the network device (e.g., using switching component 310, output component 315, controller 320, and/or the like) may generate the network performance indicators using the packet replica or a group of packet replicas that have been modified and received over time, as described above with regard to FIGS. 1A-1C.

As further shown in FIG. 6, process 600 may include providing the network performance indicators to a particular device (block 650). For example, the network device (e.g., using switching component 310, output component 315, controller 320, and/or the like) may provide the network performance indicators to a particular device, as described above with regard to FIGS. 1A-1C.

Process 600 may include additional implementations, such as any single implementation or any combination of implementations described below and/or in connection with one or more other processes described elsewhere herein.

In some implementations, a forwarding plane used to route the traffic flow may not be modified when the one or more values of the packet replica are modified. In some implementations, the packet replica or the group of packet replicas may have IP address information that matches the IP address information of the packets that are part of the traffic flow of the IP session. In some implementations, the traffic flow of the IP session may be subject to a service-level agreement (SLA) that requires the network performance indicators to conform to a particular standard.

In some implementations, when performing the validation procedure, the network device may process the packet replica to determine that a header of the packet replica includes a first value that causes the packet replica to fail the validation procedure, where the first value is an IP header checksum value, a packet length value, or an IP header time to live (TTL) value. In some implementations, the network performance indicators may include at least one of: a first network performance indicator to verify an order in which packets are received, a second network performance indicator to identify packet loss, or a third network performance indicator to identify packet delay.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic flow may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first network device, comprising:
one or more memories; and
one or more processors, to:
receive packets as part of a traffic flow of an internet protocol (IP) session;
select a packet that is part of the traffic flow based on a rule;
generate a packet replica of the packet that has been selected;
add, to the packet replica, routing information that is capable of being used to generate network performance indicators associated with the IP session;
modify a portion of the packet replica to include, in addition to the routing information, one or more values that will cause the packet replica to fail to reach a destination device associated with the IP session, to create a modified packet that is different from the packet replica; and
provide the modified packet to one or more other network devices to cause a second network device, of the one or more other network devices, to:
perform a validation procedure to determine that the modified packet is unable to be validated based on the one or more values included in the modified packet,
generate or cause another device to generate the network performance indicators using the modified packet or a group of modified packets, and
provide or cause the other device to provide the network performance indicators to a particular device.

2. The first network device of claim 1, wherein a forwarding plane of the first network device is not modified when the portion of the packet replica is modified.

3. The first network device of claim 1, wherein the one or more processors, when providing the modified packet to the one or more other network devices, are to:
provide, to the one or more other network devices, the modified packet as part of the traffic flow of the IP session.

4. The first network device of claim 1, wherein the modified packet or the group of modified packets have IP address information that matches the IP address information of the packets that are part of the traffic flow of the IP session.

5. The first network device of claim 1, wherein the rule is:
a first rule indicating to select particular packets after a threshold time period, a second rule indicating to randomly select the particular packets,
a third rule indicating to select the particular packets based on the particular packets including a particular IP address or identifier, or
a fourth rule indicating to select the particular packets based on a routing or forwarding path of the particular packets.

6. The first network device of claim 1, wherein the traffic flow is supported by a label switching network; and
wherein the routing information includes segment routing operations, administration, and maintenance (OAM) information.

7. The first network device of claim 1, wherein the one or more processors, when modifying the portion of the packet replica to create the modified packet, are to:
set an IP header checksum value to a first incorrect value,
set a packet length value to a second incorrect value, or
set an IP header time to live (TTL) value to a third incorrect value.

8. A method, comprising:
receiving, by a first network device, packets as part of a traffic flow of an internet protocol (IP) session;
selecting, by the first network device, a packet that is part of the traffic flow;
generating, by the first network device, a packet replica of the packet that has been selected;
adding, by the first network device and to the packet replica, routing information that is capable of being used to generate network performance indicators associated with the IP session;
modifying, by the first network device, the packet replica, to create a modified packet that is different from the packet replica, to include, in addition to the routing information, one or more values that will cause the modified packet to fail to reach a destination device associated with the IP session; and
providing, by the first network device and as part of the traffic flow of the IP session, the modified packet to one or more other network devices to cause a second network device, of the one or more other network devices, to remove the modified packet from the traffic flow of the IP session based on the modified packet including the one or more values that have been modified, and to perform one or more actions that cause the network performance indicators to be generated and provided to another device.

9. The method of claim 8, wherein a forwarding plane of the first network device is not modified when the packet replica is modified.

10. The method of claim 8, wherein the network performance indicators are generated based on the modified packet or a group of modified packets; and
wherein the modified packet or the group of modified packets have IP address information that matches the IP address information of the packets that are part of the traffic flow of the IP session.

11. The method of claim 8, wherein selecting the packet that is part of the traffic flow comprises:
selecting the packet based on at least one of:
a first rule indicating to select particular packets after a threshold time period,
a second rule indicating to randomly select the particular packets,
a third rule indicating to select the particular packets based on the particular packets including a particular IP address or identifier, or
a fourth rule indicating to select the particular packets based on a routing or forwarding path of the particular packets.

12. The method of claim 8, wherein the routing information includes at least one of:
session information for the IP session, or
packet information for the modified packet or a group of modified packets.

13. The method of claim 8, wherein adding the routing information comprises:
adding the routing information to the packet replica as an additional header of the packet replica or as part of a payload of the packet replica.

14. The method of claim 8, wherein modifying the packet replica comprises:
setting an IP header checksum value to a first incorrect value,
setting a packet length value to a second incorrect value, or
setting an IP header time to live value to a third incorrect value.

15. A non-transitory computer-readable medium storing instructions, the instructions comprising:
one or more instructions that, when executed by one or more processors of a network device, cause the one or more processors to:
receive, from another network device, a modified packet as part of a traffic flow of an internet protocol (IP) session, wherein the modified packet has been generated by the other network device based on a packet replica of a packet selected from part of the traffic flow based on a rule;
wherein routing information capable of being used to generate network performance indicators associated with the IP session has been added to the packet replica by the other network device; and
wherein the modified packet has been generated, by the other network device, by modifying the packet replica to include, in addition to the routing information, one or more values that will cause the modified packet to fail to reach a destination device associated with the IP session;
perform a validation procedure by processing the modified packet,
wherein the modified packet is to fail the validation procedure based on the one or more values included in the modified packet;
identify the routing information included in the modified packet based on the modified packet failing the validation procedure;
generate the network performance indicators using the modified packet or a group of modified packets that have been modified and received over time; and
provide the network performance indicators to a particular device.

16. The non-transitory computer-readable medium of claim 15, wherein a forwarding plane used to route the traffic flow is not modified when the one or more values of the modified packet are modified.

17. The non-transitory computer-readable medium of claim 15, wherein the modified packet or the group of modified packets have IP address information that matches the IP address information of the packets that are part of the traffic flow of the IP session.

18. The non-transitory computer-readable medium of claim 15, wherein the traffic flow of the IP session is subject to a service-level agreement (SLA) that requires the network performance indicators to conform to a particular standard.

19. The non-transitory computer-readable medium of claim 15, wherein the one or more instructions, that cause the one or more processors to perform the validation procedure, cause the one or more processors to:
   process the modified packet to determine that a header of the modified packet includes a first value that causes the modified packet to fail the validation procedure, wherein the first value is:
      an IP header checksum value,
      a packet length value, or
      an IP header time to live value.

20. The non-transitory computer-readable medium of claim 15, wherein the network performance indicators include at least one of:
   a first network performance indicator to verify an order in which packets are received,
   a second network performance indicator to identify packet loss,
   a third network performance indicator to identify packet delay,
   a fourth network performance indicator to identify latency, or
   a fifth network performance indicator to identify jitter.

* * * * *